United States Patent
Hilburn

(10) Patent No.: US 9,598,117 B1
(45) Date of Patent: Mar. 21, 2017

(54) METALLIC DEBRIS COLLECTION SYSTEM

(71) Applicant: Eric Hilburn, Machesney Parl, IL (US)

(72) Inventor: Eric Hilburn, Machesney Parl, IL (US)

(*) Notice: Subject to any disclaimer, the term of this patent is extended or adjusted under 35 U.S.C. 154(b) by 0 days.

(21) Appl. No.: 15/052,999

(22) Filed: Feb. 25, 2016

(51) Int. Cl.
*B62D 25/18* (2006.01)
*B60R 16/02* (2006.01)

(52) U.S. Cl.
CPC .......... *B62D 25/182* (2013.01); *B60R 16/02* (2013.01)

(58) Field of Classification Search
CPC .... B62D 25/16; B62D 25/161; B62D 25/163; B62D 25/168; B62D 25/18; B62D 25/182; B62D 25/188; B60R 16/02
USPC ......... 280/847, 152.1, 848, 153.5, 154, 849, 280/851, 155, 156, 157, 853
See application file for complete search history.

(56) References Cited

U.S. PATENT DOCUMENTS

| 931,885 A | * | 8/1909 | Powel et al. | B60R 19/54 15/3 |
| 1,178,680 A | * | 4/1916 | Rosenthal | B60R 19/54 15/3 |
| 1,726,158 A | | 8/1929 | Masury et al. | |
| 2,818,176 A | | 12/1957 | Polich | |
| 3,956,111 A | | 5/1976 | Manfredi | |
| 4,903,856 A | | 2/1990 | Watts | |
| D331,380 S | | 12/1992 | Craddock | |
| 5,481,983 A | | 1/1996 | Guzman et al. | |
| 8,408,601 B1 | * | 4/2013 | Miranda | B62D 25/18 280/847 |

* cited by examiner

*Primary Examiner* — John Walters

(57) ABSTRACT

A metallic debris collection system includes a vehicle that has at least one mud flap and a cab. The at least one mud flap has a distal edge with respect to the vehicle. The distal edge is suspended above the support surface. A collection unit is removably coupled to the at least one mud flap and the collection unit is suspended above the support surface. The collection unit is electrically coupled to the vehicle such that the collection unit generates a magnetic field. Thus, the collection unit magnetically attracts magnetic objects from the support surface while the vehicle is driven. Thus, the magnetic objects are inhibited from puncturing a tire.

5 Claims, 4 Drawing Sheets

METALLIC DEBRIS COLLECTION SYSTEM

FIELD OF THE DISCLOSURE

The disclosure relates to collection devices and more particularly pertains to a new collection device for collecting metallic objects from a roadway.

SUMMARY OF THE DISCLOSURE

An embodiment of the disclosure meets the needs presented above by generally comprising a vehicle that has at least one mud flap and a cab. The at least one mud flap has a distal edge with respect to the vehicle. The distal edge is suspended above the support surface. A collection unit is removably coupled to the at least one mud flap and the collection unit is suspended above the support surface. The collection unit is electrically coupled to the vehicle such that the collection unit generates a magnetic field. Thus, the collection unit magnetically attracts magnetic objects from the support surface while the vehicle is driven. Thus, the magnetic objects are inhibited from puncturing a tire.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
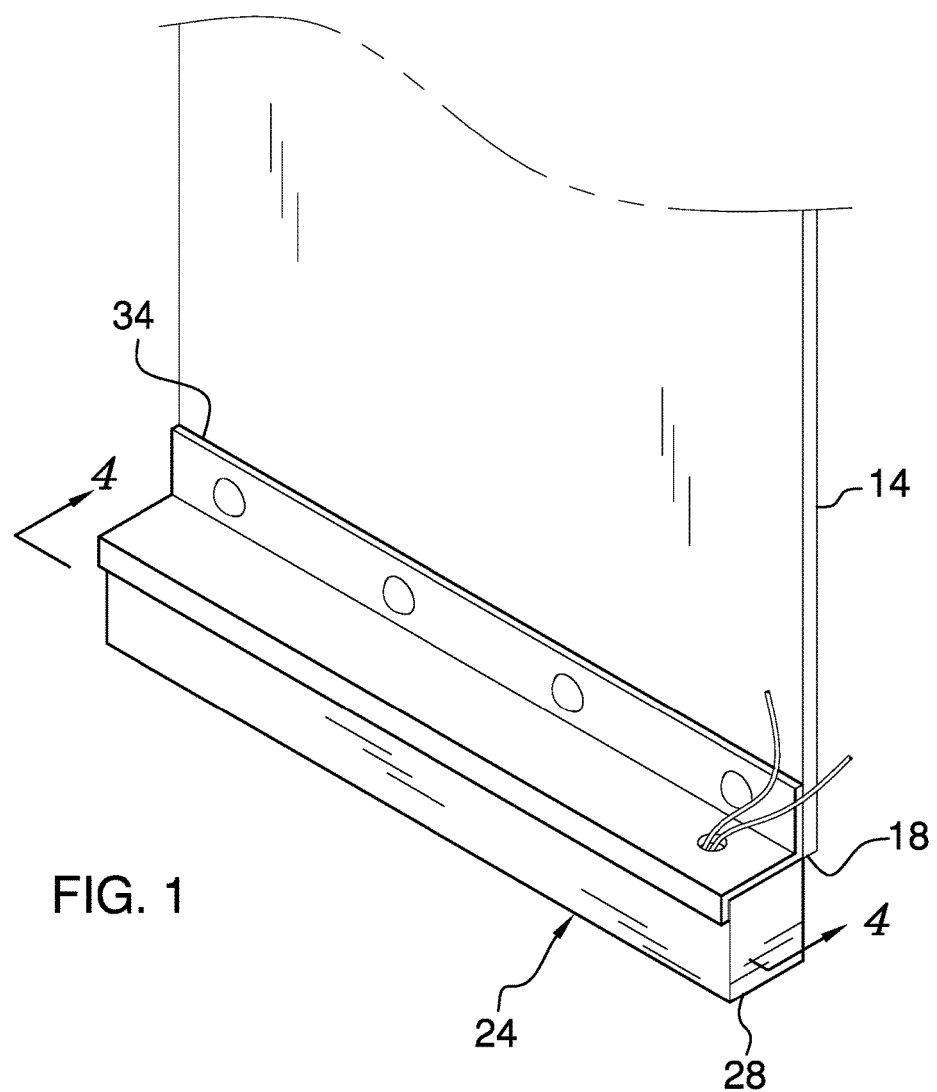
FIG. 1 is a back perspective view of a metallic debris collection system according to an embodiment of the disclosure.
Figure 2:
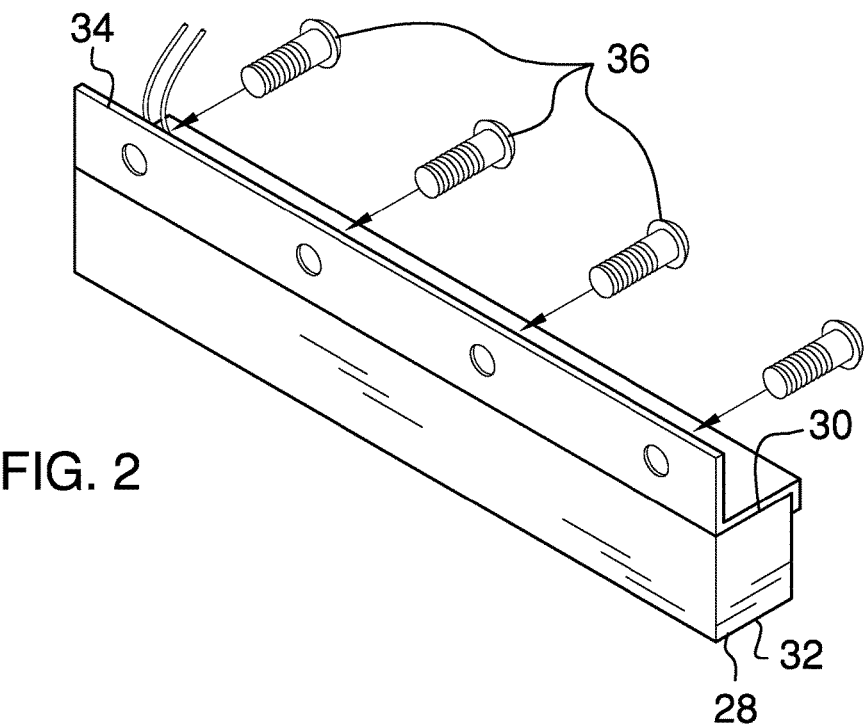
FIG. 2 is a front view of an embodiment of the disclosure.
Figure 3:
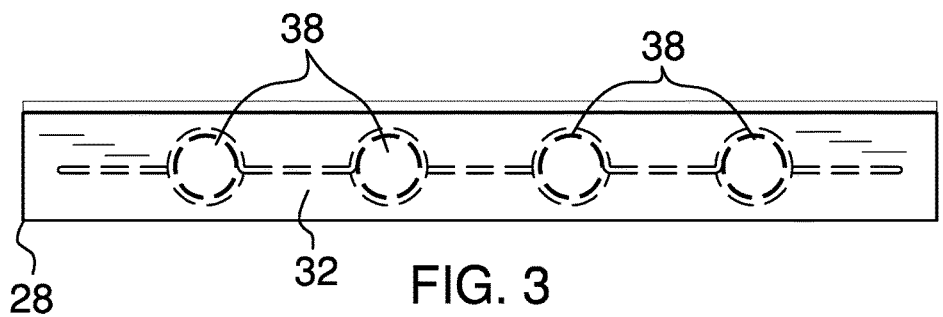
FIG. 3 is a bottom phantom view of an embodiment of the disclosure.
Figure 4:
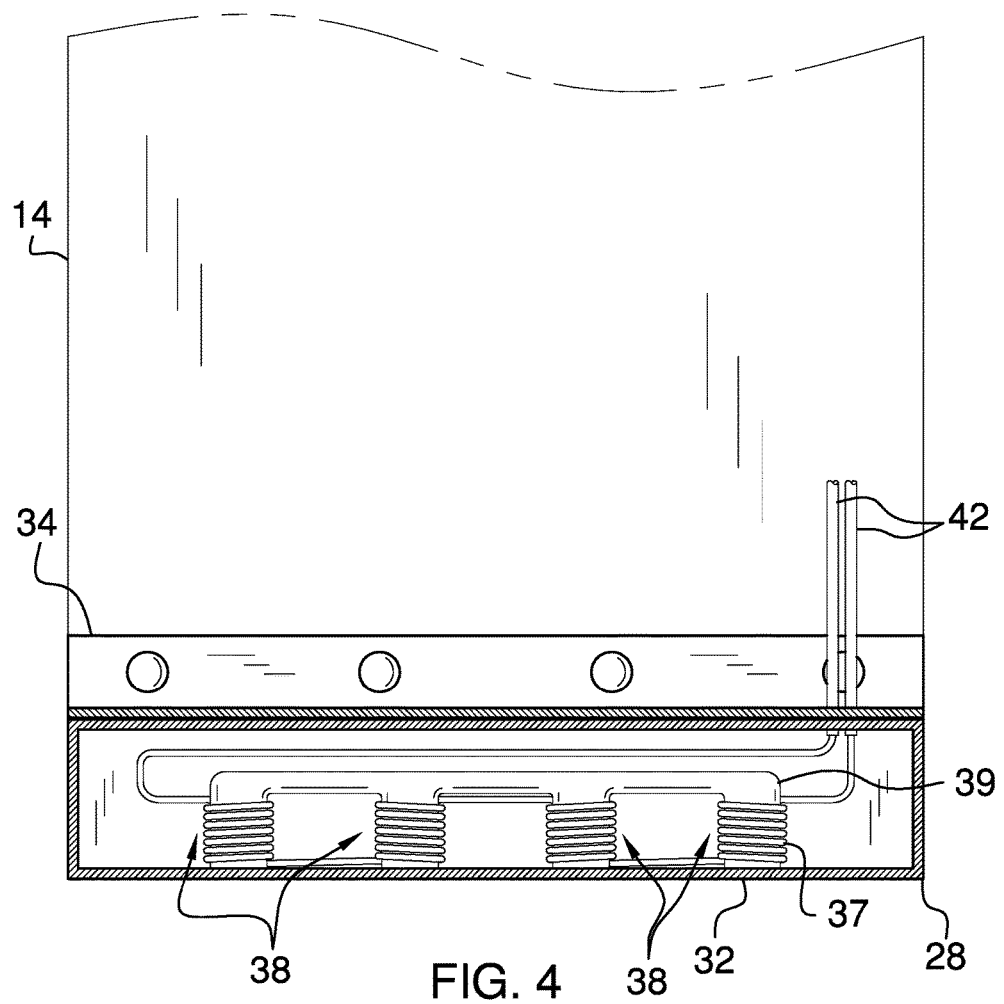
FIG. 4 is a cross sectional view taken along line 4-4 of FIG. 1 of an embodiment of the disclosure.
Figure 5:
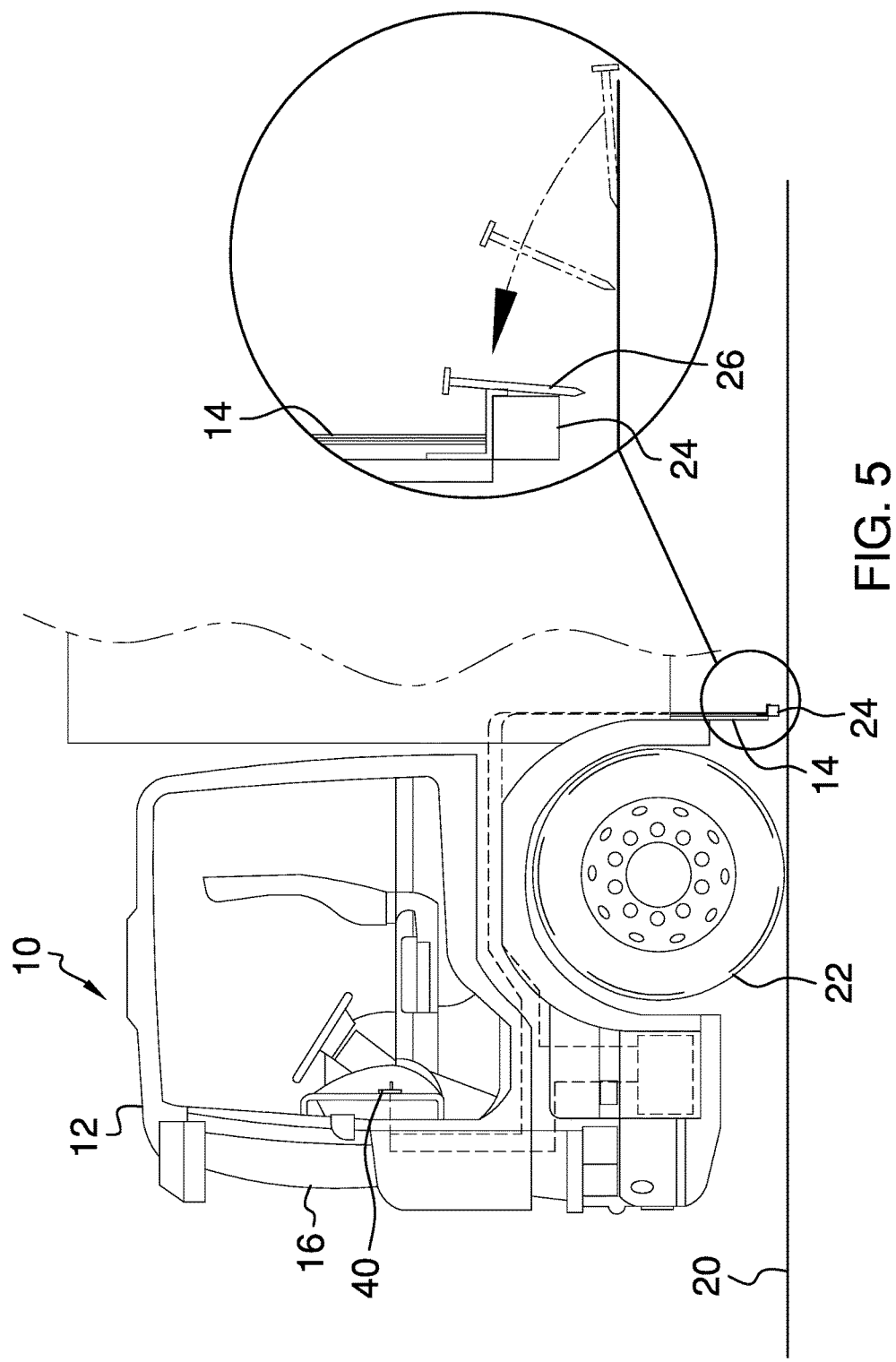
FIG. 5 is a perspective in-use view of an embodiment of the disclosure.

With reference now to the drawings, and in particular to FIGS. 1 through 5 thereof, a new collection device embodying the principles and concepts of an embodiment of the disclosure and generally designated by the reference numeral 10 will be described.

As best illustrated in FIGS. 1 through 5, the metallic debris collection system 10 generally comprises a vehicle 12 that has at least one mud flap 14 and a cab 16. The at least one mud flap 14 has a distal edge 18 with respect to the vehicle 12. The distal edge 18 is suspended above a support surface 20. The support surface 20 may comprise a roadway or the like. The at least one mud flap 14 may be positioned in adjacent to a tire 22 on the vehicle 12 and the vehicle 12 may be a truck or the like.

A collection unit 24 is removably coupled to the at least one mud flap 14 such that the collection unit 24 is suspended above the support surface 20. The collection unit 24 is electrically coupled to the vehicle 12. The collection unit 24 generates a magnetic field to magnetically attract magnetic objects 26 from the support surface 20 while the vehicle 12 is driven. Thus, the magnetic objects 26 are inhibited from puncturing the tire 22. The magnetic objects 26 may comprise a nail, a screw or any metallic object. A plurality of the collection units 24 may be provided and each of the collection units 24 may be coupled to an associated one of a plurality of mud flaps 14.

The collection unit 24 comprises a housing 28 that has a top wall 30 and a bottom wall 32. The top wall 30 has a lip 34 extending upwardly therefrom and the lip 34 is coupled to the at least one mud flap 14. The top wall 30 may abut the distal edge 18 of the at least one mud flap 14. Thus, the bottom wall 32 may be spaced from the support surface 20. The housing 28 is comprised of a non-magnetic material such as stainless steel or the like. Thus, magnetic objects 26 are inhibited from being magnetically attracted to the housing 28.

A plurality of fasteners 36 is provided. Each of the fasteners 36 extends through the lip 34 and engages the at least one mud flap 14. Thus, the housing 28 is retained on the at least one mud flap 14. Each of the fasteners 36 may comprise a bolt or the like.

A plurality of electromagnets 38 is positioned within the housing 28. Each of the electromagnet 38 selectively generates a magnetic field. Thus, each of the electromagnets 38 magnetically attracts the magnetic objects 26 to stick to the bottom wall 32 of the housing 28 when the vehicle 12 is driven. Each of the electromagnets 38 may comprise a coil wound 37 around a metallic core 39.

A switch 40 is positioned within the cab 16 and the switch 40 may be manipulated. The switch 40 is electrically coupled to the vehicle 12. The switch 40 is electrically coupled to each of the electromagnets 38 such that the switch 40 turns each of the electromagnets 38 on and off. A pair of conductors 42 or the like may extend between the switch 40 and the electromagnets 38.

In use, the switch 40 is manipulated to turn the electromagnets 38 on while the vehicle 12 is being driven. The electromagnets 38 magnetically attract the magnetic objects 26 on the support surface 20. Thus, the magnetic objects 26 are inhibited from puncturing the tire 22 on the vehicle 12. The switch 40 is manipulated to turn the electromagnets 38 off when the vehicle 12 is not being driven. The magnetic objects 26 that have collected on the bottom wall 32 of the housing 28 are released from the housing 28 and the magnetic objects 26 are collected for disposal. The non-magnetic material of the housing 28 inhibits magnetized objects from remaining on the housing 28 when the electromagnets 38 are turned off.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A metallic debris collection system comprising:
  a vehicle having at least one mud flap and a cab, said at least one mud flap having a distal edge with respect to said vehicle, said distal edge being suspended above a support surface;
  a collection unit being removably coupled to said at least one mud flap wherein said collection unit is configured to be suspended above the support surface, said collection unit being electrically coupled to said vehicle such that said collection unit generates a magnetic field wherein said collection unit is configured to magnetically attract magnetic objects from the support surface while the vehicle is driven thereby inhibiting the magnetic objects from puncturing a tire; and
  wherein said collection unit comprises a housing having a top wall and a bottom wall, said top wall having a lip extending upwardly therefrom, said lip being coupled to said at least one mud flap wherein said bottom wall is configured to be spaced from the support surface, said housing being comprised of a non-magnetic material wherein said housing is configured to inhibit magnetic objects from being magnetically attracted to said housing.

2. The system according to claim 1, further comprising a plurality of fasteners, each of said fasteners extending through said lip and engaging said at least one mud flap such that said housing is retained on said at least one mud flap.

3. A metallic debris collection system comprising:
  a vehicle having at least one mud flap and a cab, said at least one mud flap having a distal edge with respect to said vehicle, said distal edge being suspended above a support surface;
  a collection unit being removably coupled to said at least one mud flap wherein said collection unit is configured to be suspended above the support surface, said collection unit being electrically coupled to said vehicle such that said collection unit generates a magnetic field wherein said collection unit is configured to magnetically attract magnetic objects from the support surface while the vehicle is driven thereby inhibiting the magnetic objects from puncturing a tire;
  a housing having a bottom wall; and
  a plurality of electromagnets, each of said electromagnets being positioned within said housing, said electromagnets being spaced apart from each other and being distributed along said bottom wall, said electromagnets being electrically coupled together, each of said electromagnets selectively generating a magnetic field wherein said electromagnets are configured to magnetically attract the magnetic object to stick to said bottom wall of said housing when said vehicle is driven.

4. The system according to claim 3, further comprising a switch being positioned within said cab wherein said switch is configured to be manipulated, said switch being electrically coupled to said vehicle, said switch being electrically coupled to each of said electromagnets such that said switch turns said each of said electromagnets on and off.

5. A metallic debris collection system comprising:
  a vehicle having at least one mud flap and a cab, said at least one mud flap having a distal edge with respect to said vehicle, said distal edge being suspended above the support surface; and
  a collection unit being removably coupled to said at least one mud flap wherein said collection unit is configured to be suspended above the support surface, said collection unit being electrically coupled to said vehicle such that said collection unit generates a magnetic field wherein said collection unit is configured to magnetically attract magnetic objects from the support surface while the vehicle is driven thereby inhibiting the magnetic object from puncturing a tire, said collection unit comprising:
    a housing having a top wall and a bottom wall, said top wall having a lip extending upwardly therefrom, said lip being coupled to said at least one mud flap wherein said bottom wall is configured to be spaced from the support surface, said housing being comprised of a non-magnetic material wherein said housing is configured to inhibit magnetic objects from being magnetically attracted to said housing,
    a plurality of fasteners, each of said fasteners extending through said lip and engaging said at least one mud flap such that said housing is retained on said at least one mud flap,
    an electromagnet being positioned within said housing, said electromagnet selectively generating an magnetic field wherein said electromagnet is configured to magnetically attract the magnetic object to stick to said bottom wall of said housing when said vehicle is driven, and
    a switch being positioned within said cab wherein said switch is configured to be manipulated, said switch being electrically coupled to said vehicle, said switch being electrically coupled to each of said electromagnets such that said switch turns said electromagnet on and off.

* * * * *